Nov. 18, 1952　　　F. G. BOUCHER　　　2,618,156
GRAVITY AND DENSITY GRADIOMETER FOR BOREHOLES
Filed Dec. 31, 1949　　　　　　　　　　　4 Sheets-Sheet 1

Frank G. Boucher Inventor
By W. O. J. Hulman Attorney

Nov. 18, 1952      F. G. BOUCHER      2,618,156
GRAVITY AND DENSITY GRADIOMETER FOR BOREHOLES
Filed Dec. 31, 1949      4 Sheets-Sheet 2

Frank G. Boucher Inventor
By W. O. T Heilman Attorney

Nov. 18, 1952     F. G. BOUCHER     2,618,156
GRAVITY AND DENSITY GRADIOMETER FOR BOREHOLES
Filed Dec. 31, 1949     4 Sheets-Sheet 3
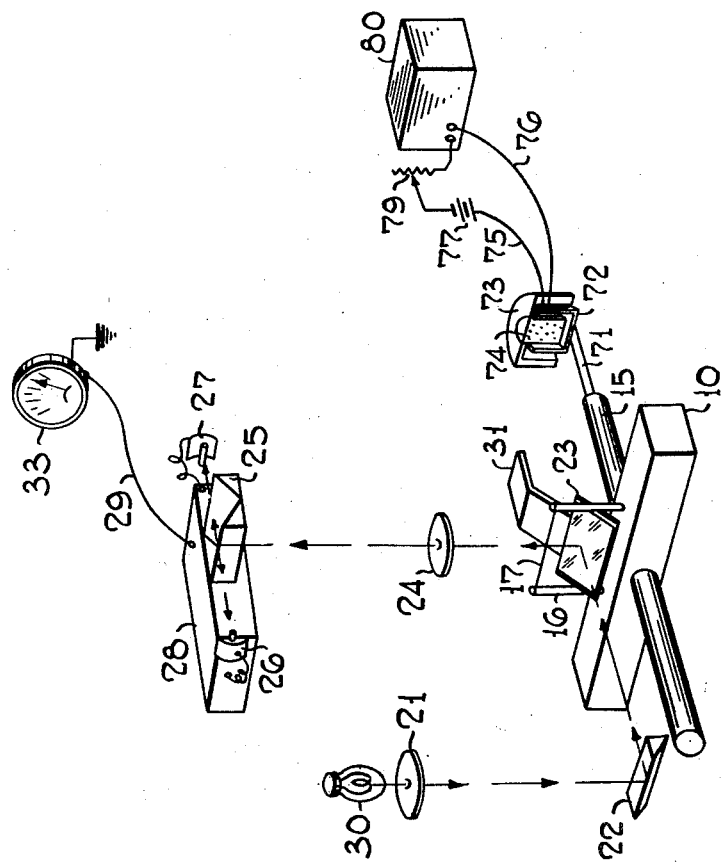
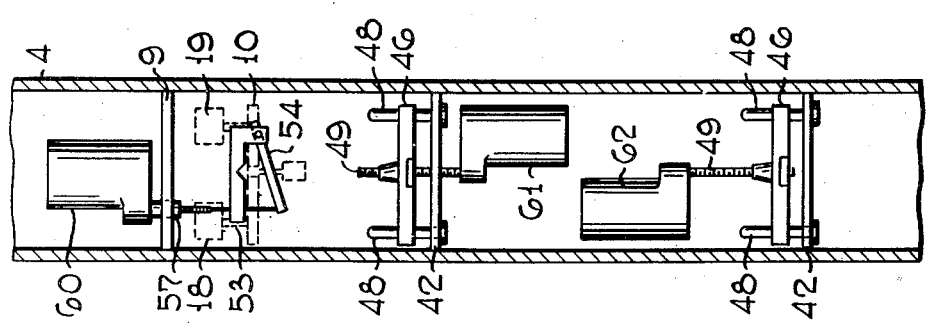
Frank G. Boucher Inventor
By W. O. Hulman Attorney Nov. 18, 1952     F. G. BOUCHER     2,618,156
GRAVITY AND DENSITY GRADIOMETER FOR BOREHOLES
Filed Dec. 31, 1949     4 Sheets-Sheet 4

Frank G. Boucher Inventor
By W. O. Hulman Attorney

Patented Nov. 18, 1952

2,618,156

UNITED STATES PATENT OFFICE 2,618,156

GRAVITY AND DENSITY GRADIOMETER FOR BOREHOLES

Frank G. Boucher, Tulsa, Okla., assignor to Standard Oil Development Company, a corporation of Delaware Application December 31, 1949, Serial No. 136,314

10 Claims. (Cl. 73—382)

The present invention is concerned with an improved apparatus for determining the density of substrata surrounding a bore hole. More particularly the invention is concerned with the provision of a sensitive device capable of being lowered into a bore hole to measure gravity gradients existing therein, from which gravity gradients differences in the density of the various strata traversed by the bore hole may be determined.

In the constant search for new sources of crude oil many means have been devised for determining whether any possibility of obtaining oil from a particular locality exists but all the methods involve considerable expenditure of time and effort and it is therefore desirable to obtain every bit of information that is available when an area is being explored. One valuable source of information regarding the geological structure of a particular area is the bore hole obtained when an oil well is being drilled. Not only is the material removed during drilling examined closely but the well bore itself is usually subjected to intensive examination to determine the nature and position of the various strata encountered. The numerous methods employed in such examination are referred to broadly as well logging methods. It is one of the objects of the present invention to provide a novel form of apparatus for well logging, particularly for logging gravity gradients existing in the bore hole.

As already mentioned it is possible to determine from the measured gravity gradients differences in density between various strata. This serves not only as an aid to tying in geological information between wells in the same oil field but also is of value in determining whether various strata are compacted by virtue of the pressure exerted by the weight of overlying strata, since the density of the stratum determined in the bore hole can be compared with the density of rock fragments from the same stratum after recovery from the bore hole. Similarly, the density of limestone beds can be determined and used as a measure of their porosity.

Density determinations of the layers near the earth's surface are also of value for making more intelligent correction of data obtained in the usual gravity meter surveys wherein the gravity meter readings must be adjusted for the near surface density of the earth in the locality of the survey. Thus it is one object of this invention to provide a sensitive device adapted to be lowered into the bore hole to determine by remotely operable means and with remote detecting devices the gravity gradients that exist in the bore hole. Other objectives as well as the nature of the invention and the manner in which it is to be performed will be apparent from the ensuing description and from the drawing in which:

Fig. 4 is a schematic representation of the remotely operable clamping devices of Fig. 3;

Fig. 5 is a detail of a portion of Fig. 3 together with associated elements and an electrical circuit, providing one means of restoring the mass suspension beam to a null position;

Briefly, the present invention comprises a device consisting of a pair of weights of equal mass, shape and volume suspended from opposite ends of a movable beam, the two weights being spaced vertically from each other on suitable supporting means, e. g. wires. Attached to each supporting means is an additional weight of the same shape and volume as the first pair of weights but of much less mass, the two lighter weights being of the same mass, one of them being placed directly opposite each of the aforementioned weights of heavy mass. In order that the device may be lowered into a bore hole a suitable case is provided, together with means for remotely clamping and unclamping the movable beam and the weights, means for remotely restoring the balance of the movable beam when it becomes unbalanced due to gravity gradients, means for remotely determining when the beam is in balance and means for measuring the force required to restore the beam to balance.

Figure 1:
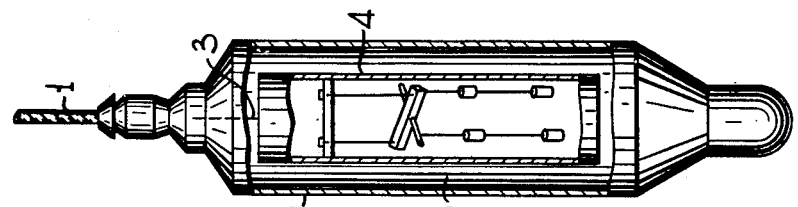
Fig. 1 is a schematic sketch showing one arrangement for suspending the device of this invention in a bore hole.

Referring now specifically to Fig. 1 of the drawing, an outer case 2 is suspended in a bore hole 101 by means of a cable 1 which is provided with suitable electrical conductors for use in conducting current between the device and suitable detecting and operating instruments at the earth's surface. An inner casing 4 is suspended within outer case 2 by suspension means 3 which may be, for example, a single wire attached to the center of the cover of case 4. Case 4 is sufficiently smaller in diameter than case 2 so as to permit as much as 10° tipping of case 2 from the vertical while case 4 remains vertical. Space 5 between the two cases is preferably filled with a liquid such as water or oil or the like.

Figure 2:
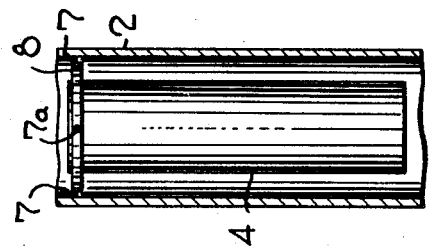
Fig. 2 is a schematic sketch showing an alternative arrangement for suspending the device.

An alternative means for suspending case 4 within case 2 is shown schematically in Fig. 2 and consists simply of a gimbal ring 8 pivotally attached to case 2 on pivots 7 and pivotally supporting case 4 on pivots 7a.

Figure 3:
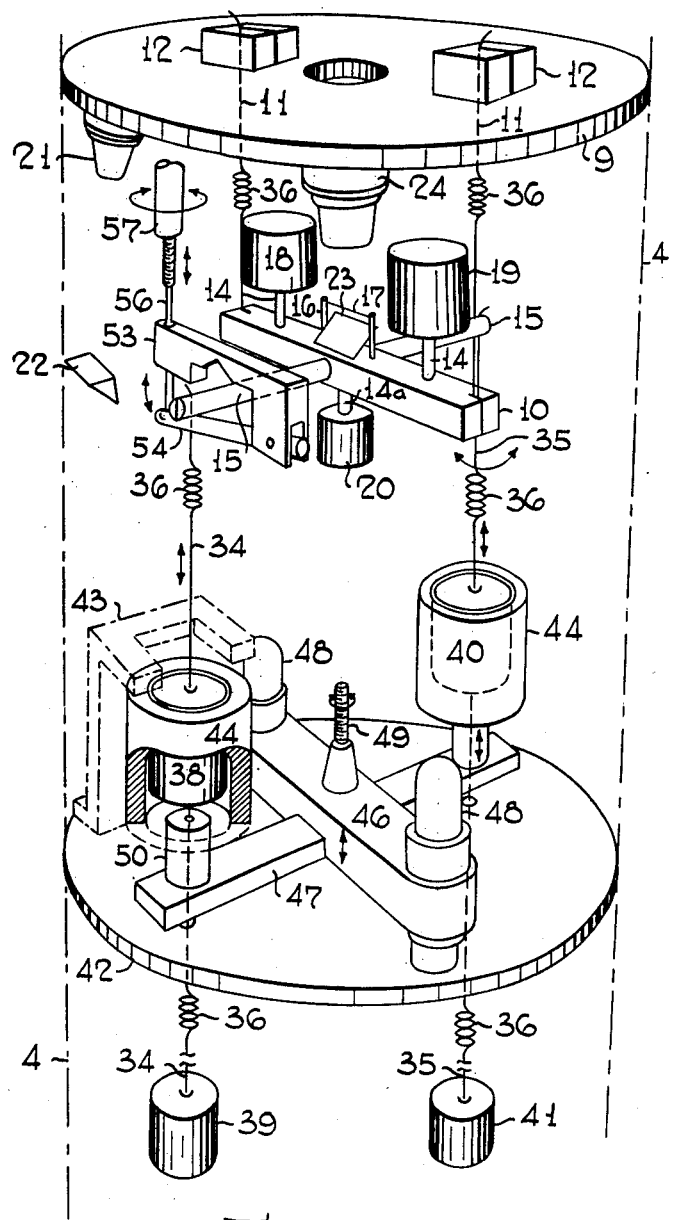
Fig. 3 is a vertical perspective view of the gravity gradient device contained within case 4 of Fig. 1.

The operating mechanism contained within case 4 is shown in Fig. 3, this being a vertical perspective view in which portions of the supporting structure have been omitted in the interest of clarity. Placed within case 4 is a suspending bracket 9 from which a suspending beam 10 is hung on supporting wires 11 which may be suitably held in place by means of clamping blocks 12. Attached to the center of beam 10 and placed in perpendicular relation thereto in a horizontal plane is a mass suspension beam 15 to which are attached mass suspension wires 34 and 35. A weight of fairly heavy mass 38 is attached to wire 34 and a weight 41 of equal mass, shape and volume is similarly attached to wire 35 but at a considerably greater distance below beam 15 than weight 38. Also attached to wire 34 at the same vertical distance from beam 15 as weight 41 is a lighter weight 39 having the same shape and volume as weights 38 and 41. In the same manner likewise, weight 40 of the same shape and volume as the other three weights but of a mass equal to weight 39 is attached to wire 35 at the same vertical distance from beam 15 as weight 38. Weights 38 and 41 are made from a material of high density such as lead or gold and weights 39 and 40 are made from lighter materials such as magnesium or aluminum or alloys thereof. Wires 34 and 35 are preferably made of material having very low ductility, high tensile strength and a low coefficient of thermal expansion. For example they may be made of tungsten or of a beryllium-copper alloy or other suitable alloy, and will be of as small a diameter as practical, i. e. in the range of about 0.001 to 0.003 inch.

Attached to beam 10 by means of vertical threaded rods 14 are additional labilizing weights 18 and 19, whose purpose is to adjust the period of swing of beam 15 about the axis of beam 10 to the desired value. An additional weight 20, suspended below beam 10 on threaded rod 14a, can be provided if desired to raise or lower the center of gravity of the beam system.

Also fixed to beam 10 are upright posts 16 which carry a thin wire 17 passing directly over the intersection of beams 10 and 15. The purpose of wire 17 is to indicate the null position of beam 15 by optical means as will be explained in more detail in connection with Fig. 5. It may be mentioned here briefly, however, that mirror 23 is adapted to receive a light beam from the lens and prism system 21 and 22 and to direct it past wire 17 into lens 24, a suitable light source and optical measuring means being contained within case 4 above bracket 9.

The sensitivity of the instrument will be found to be more or less proportional to the vertical distance between weights 38 and 41 and to the square of the period of swing of beam 15. For practical purposes the beam 15 should have a period of about 20 to 30 seconds, preferably about 25 seconds, and the vertical distance between weights 38 and 41 should be of the order of 8 to 12 feet. It is to be understood, of course, that the invention is not to be limited by these specific dimensions, and greater distances between the weights may be employed if desired.

In order that the sensitivity of the instrument will not be adversely affected by damage to the weights and/or supporting means when the apparatus is being lowered into or raised out of the bore hole, remotely operable clamping means are provided for holding the beams and weights in place when desired. The clamping means for the weights comprises a horizontal arm 46 slidably supported on vertical posts 48 and adapted to be raised or lowered by threaded rod 49. Attached to arm 46 is a cross-arm 47 to which are fixed locking posts 50, adapted to press each of the weights up against a clamping block 43. Only one block 43 is shown, in phantom view, but a similar block is provided for each of the four weights. Blocks 43 and posts 48 are supported by bracket 42, fixed to case 4. The method of raising and lowering arms 46 and 47 will be more readily apparent from the ensuing description in connection with Fig. 4. Similar clamping means are provided for the lower weights 39 and 41, but these are omitted from the drawing in order to prevent undue complication thereof. Each of the clamping blocks 43 also supports an air damping cup 44. These cups surround the weights 38 to 41, inclusive, but do not touch them and thus serve to damp the moving system of beam and weights without interfering with its motion or its sensitivity.

To preserve the sensitivity of the instrument, springs 36 may be attached to suspension wires 34 and 35 at points intermediate each of the clamping devices. These springs are of such strength that they will not give appreciably under the load of the weights and yet will take up the slack in the suspension wires when the weights are lifted into clamping position, thus preventing kinks in the suspension wires.

Similar springs 36 may also be attached intermediate the ends of wires 11 for the same reason. An embodiment of the invention in which the springs 36 are omitted is also contemplated, their use being advocated only when extreme sensitivity is desired.

Means for locking beam 15 in place comprises a fixed bracket 53 placed just above beam 15 and a movable arm 54 pivotally attached below beam 15 on a vertical extension of bracket 53. The free end of arm 54 is adapted to be raised or lowered by means of vertical rod 56 having a threaded end which engages a tapped motor shaft 57. A similar locking device is provided on the other end of beam 15 but is omitted from the drawing.

The operation of the clamping devices will be readily understood by reference to Fig. 4. Threaded rods 49 and tapped shaft 57 are adapted to be rotated in either direction by means of gear-reduced reversible electric motors 60, 61 and 62, which are suitably fixed within case 4. These motors can be remotely operated in either direction from the earth's surface through suitable conductors within cable 1. The electrical leads supplying each motor are not shown in the drawing but their distribution within case 4 is merely a matter of convenience and design. In order that the motors will not exert too great a force on the clamping devices each motor may be provided with a friction clutch. Slipping of the clutch can be detected at the surface by means of an ammeter in the power circuit. A related arrangement of remotely operable clamping means is described and claimed in copending application Serial #794,617 of Herbert E. Owen, filed December 30, 1947, now U. S. Patent 2,560,366, issued July 10, 1951.

To ensure that there will be no adhesion of beam 15 to bracket 53 or to arm 54, adjustable screw clamping points and wire springs may be provided on the bracket and arm in the manner described in U. S. Patent 2,349,404, of Donald W. Blair and Frank G. Boucher.

Briefly the device of this invention operates on the following principle: Neglecting lighter weights 39 and 40 for the moment, it is apparent that if weights 38 and 41 were placed at the same elevation the beam 15 would be in balance. Since the latter two weights are at different elevations, however, any gravity gradient in the vicinity of the apparatus will cause beam 15 to be unbalanced, the amount of unbalance being proportional to the gravity gradient. The purpose of weights 39 and 40 is to compensate for possible differences in air density at the upper and lower weight levels resulting from temperature differences, for example.

In order to measure gravity gradients as a function of the amount of unbalance of the beam, several arrangements may be employed, one of which is shown in Fig. 5. Light from a suitable light source 30 is focused by means of lens arrangement 21 on to a reflecting prism 22, thence to reflecting mirror 23, which is fixed between posts 16 by means of a bracket 31 which may be attached to case 4 at any suitable point as, for example, to bracket 9. Reflected light passes from mirror 23 past wire 17 and through lens 24 to a beam-splitting prism 25. One half of the split beam is directed toward photosensitive cell 26 and the other half toward photosensitive cell 27. Lens 24 has the proper magnifying characteristics to enlarge the shadow of wire 17 so that it will cover a considerable portion of the bottom areas of reflecting prism 25. When beam 15 is in a level position the amounts of light falling on each half of prism 25 will be equal. Cells 26 and 27 are connected in electrical opposition and are also connected to a balanced amplifier 28, the output of which is sent to the earth's surface through lead 29 which may be suitably carried by cable 1. Lead 29 is connected at the earth's surface with a galvanometer 33. When the same amount of light reaches cells 26 and 27 the net electrical output will be zero and hence galvanometer 33 will give a zero reading. When beam 15 is off balance more light will reach one cell than the other and galvanometer 33 will read either plus or minus.

When beam 15 is indicated to be off balance as a result of a gravity gradient its balance may be restored by one of several means. For example, a coil 72 may be carried on an extension 71 of beam 15 and the coil may be arranged in the field of a suitably supported cup-shaped magnet 73 having a central core 74. The central core constitutes one pole of the magnet and the outer rim of the cup the other pole. An electrical current may be fed through coil 72 by means of leads 75 and 76 connected to suitable equipment at the earth's surface through cable 1. The latter equipment may comprise, for example, a battery 77 and adjustable resistor 79 and a current measuring means 80, all connected in series with leads 75 and 76. Current reading means 80 may comprise, for example, a sensitive potentiometer and galvanometer arrangement. By a suitable calibration the amount of current necessary to bring beam 15 back to balance may be determined as a function of difference in gravity forces. In order to avoid reversing the current through coil 72 to take care of unbalances of beam 15 in both directions, the beam may be designed so as to be off balance in a direction opposing the force of the magnetic field and currents detected by measuring means 80 below a stated value may be taken as a measure of beam unbalance in one direction and those above that value as a measure of beam unbalance in the opposite direction.

Figure 6:
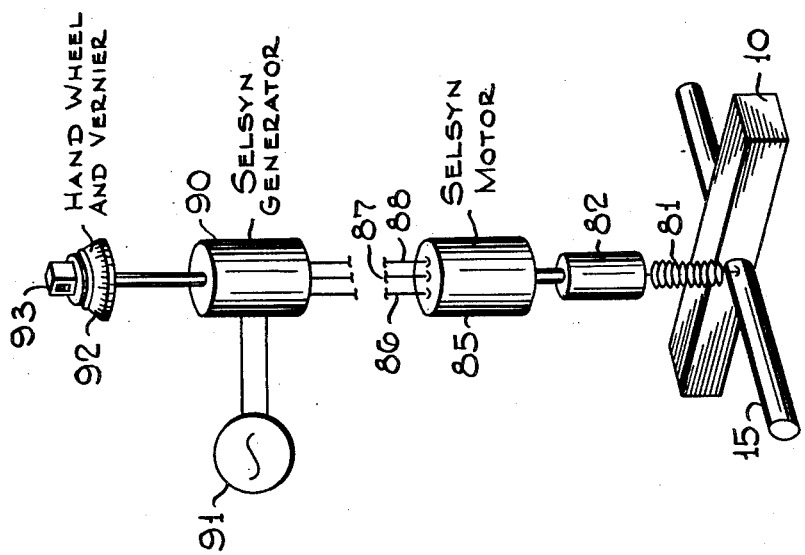
Fig. 6 is a schematic diagram of an alternative means for balancing the mass suspension beam.

An alternative means of balancing beam 15 is depicted diagrammatically in Fig. 6. One end of helical spring 81 is attached to beam 15 at a point near its fulcrum. The other end of spring 81 is attached to a micrometer head 82 mounted on the shaft of a selsyn motor 85 suitably supported within case 4. Leads 86, 87 and 88 connect motor 85 with a selsyn generator 90 at the earth's surface, alternating current being fed to the selsyn system from a suitable source 91. Thus selsyn motor 85 may be turned a desired number of revolutions by selsyn generator 90 and the number of turns needed may be calibrated as a function of the amount of force required to be exerted on spring 81 to bring beam 15 back into balance. The turns made by selsyn generator 90 may be recorded by a counter 93 and vernier arrangement 92, the vernier also constituting a hand wheel for turning the selsyn generator.

Figure 7:
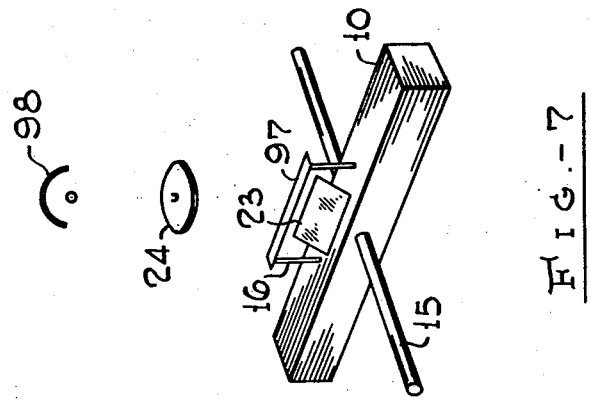
Fig. 7 is a schematic diagram showing a means for directly reading the amount of mass suspension beam unbalance.

Instead of providing for a null reading arrangement for beam 15 as described in connection with Fig. 5, provision may be made for a direct reading of the amount of beam unbalance as shown, for example, in Fig. 7. Wire 17 is replaced by a relatively wide strip 97 whose shadow is focused by means of lens arrangement 24 on to a photoelectric cell 98, the relation of the elements being such that when beam 15 is off balance in one direction no shadow will be cast by strip 97 on cell 98 and when beam 15 is off balance in the opposite direction strip 97 will cast a full shadow. Thus suitable calibration can be made between the swing of beam 15 and the amount of light detected by cell 98.

Calibration of the completely assembled instrument may be made by comparing the amount of beam displacement obtained when the instrument is surrounded by various media of known density.

It is intended that this invention be limited only by the following claims and not by the specific embodiments described in the foregoing specification.

What is claimed is:

1. An apparatus for determining gravity gradients in a borehole comprising a case adapted to be lowered into a borehole, a first suspending beam within said case, a pair of supporting wires attached to said case in the interior thereof and supporting said suspending beam in a horizontal position, a mass suspension beam attached to the center of said first suspending beam and at right angles thereto in a horizontal plane, a pair of mass suspension wires attached to the ends of said mass suspension beam and extending downwardly therefrom, a first relatively heavy mass attached to one of said mass suspension wires at a point intermediate its ends, a first relatively light mass attached to the lower end of said last named wire, a second relatively heavy mass attached to the lower end of the second of said mass suspension wires at a vertical distance from said mass suspension beam exactly equal to the vertical distance of said first relatively light mass from said beam, a second relatively light mass attached to said second mass suspension wire at a point intermediate its ends and at a vertical distance from said mass suspension beam exactly equal to the vertical distance of said first relatively heavy mass from said beam, said pair of relatively heavy masses being of the same weight, size and shape, said pair of relatively light masses being of equal weight and of the same size and shape as said relatively heavy masses, and means adapted to detect remotely a state of unbalance of said mass suspension beam.

2. Apparatus according to claim 1 including helical springs fixed in each of said supporting wires intermediate the ends thereof.

3. Apparatus according to claim 1 including helical springs fixed in each of said mass suspension wires at points intermediate said masses and at points intermediate said upper masses and said mass suspension beam.

4. Apparatus according to claim 1 including remotely operable clamping means adapted to clamp at least one of said masses against movement thereof, said clamping means comprising a block held by said case and having at least a portion projecting over said mass but normally out of contact therewith, a lifting member disposed below said mass, vertical guide means supported by said case and slidably receiving said lifting member, lifting means attached to and supporting said lifting member, and remotely operable motor means selectively driving said lifting means so as to raise said lifting member, thereby pressing said mass against the projecting portion of said block, and to lower said lifting member, thereby moving said mass out of contact with said block and moving said lifting member out of contact with said mass.

5. Apparatus according to claim 1 in which said case is pivotally supported adjacent its upper end within an outer protective case, the space defined between the two cases being filled with a viscous liquid.

6. Apparatus according to claim 1 in which said means for detecting unbalance of said mass suspension beam comprises an elongate member of finite width held by said first suspended beam above the point of intersection of said beams and parallel to said first suspending beam, means adapted to cast a shadow from said elongate member and photoelectric means adapted to respond in relation to the position of said shadow.

7. Apparatus according to claim 6 in which said elongate member comprises a flat strip.

8. Apparatus according to claim 1 in which said means for detecting unbalance of said mass suspension beam comprises a wire held by said first suspended beam above the point of intersection of said beams and parallel to said first suspending beam, means adapted to cast a shadow from said last named wire and photoelectric means adapted to respond in relation to the position of said shadow.

9. Apparatus according to claim 1 including means for remotely restoring said mass suspension beam to a state of balance in opposition to gravity gradients causing a state of unbalance thereof, said balance restoring means comprising a coil of wire attached to one end of said mass suspension beam, a magnet disposed adjacent said coil, a source of current connected to said coil and means for indicating the amount of current supplied to said coil.

10. Apparatus according to claim 1 including means for remotely restoring said mass suspension beam to a state of balance in opposition to gravity gradients causing a state of unbalance thereof, said balance restoring means comprising a helical spring attached at one end to said mass suspension beam at a point adjacent the fulcrum of said beam, a selsyn motor adjacent said helical spring, means connecting the free end of said helical spring to said selsyn motor, a selsyn generator at the earth's surface, an electrical circuit connecting said generator with said motor, a source of electrical current for said generator, and means for measuring the revolutions made by said generator.

FRANK G. BOUCHER.

REFERENCES CITED

The following references are of record in the file of this patent:

UNITED STATES PATENTS

| Number | Name | Date |
|---|---|---|
| 1,898,534 | Hartley | Feb. 21, 1933 |
| 2,149,953 | Birnbaum | Mar. 7, 1939 |
| 2,239,049 | Morris | Apr. 22, 1941 |
| 2,294,201 | Pepper | Aug. 25, 1942 |
| 2,296,330 | Blau | Sept. 22, 1942 |
| 2,327,697 | Boucher | Aug. 24, 1943 |
| 2,367,126 | James | Jan. 9, 1945 |
| 2,384,739 | Hasbrook | Sept. 11, 1945 |